United States Patent
Shi et al.

(10) Patent No.: US 6,917,903 B2
(45) Date of Patent: Jul. 12, 2005

(54) METHOD FOR REMOVING PSEUDO SIGNAL AND PROGRAM FOR REMOVING PSEUDO SIGNAL

(75) Inventors: Qinzhong Shi, Tsukuba (JP); Hideaki Uchikawa, Tsukuba (JP)

(73) Assignee: Japan Aerospace Exploration Agency, Ibaraki (JP)

( * ) Notice: Subject to any disclaimer, the term of this patent is extended or adjusted under 35 U.S.C. 154(b) by 38 days.

(21) Appl. No.: 10/652,034

(22) Filed: Sep. 2, 2003

(65) Prior Publication Data

US 2004/0143407 A1 Jul. 22, 2004

(30) Foreign Application Priority Data

Sep. 2, 2002 (JP) ........................................ 2002-256871

(51) Int. Cl.[7] .......................... G06F 15/00; H03F 1/26; H04B 15/00
(52) U.S. Cl. ..................................................... 702/190
(58) Field of Search ............................. 702/66, 67, 69, 702/70, 75–77, 79, 190, 191, 193; 324/76.11, 76.28, 76.29; 704/205, 500

(56) References Cited

U.S. PATENT DOCUMENTS 6,249,749 B1 * 6/2001 Tran et al. ..................... 702/66

2004/0010203 A1 * 1/2004 Bibian et al. ................ 600/544

FOREIGN PATENT DOCUMENTS

| JP | 06-052270 B | 7/1994 |
| JP | 06-052270 | * 7/1994 |

OTHER PUBLICATIONS

*Salvaging Pyrotechnic Data with Minor Overloads and Offsets*, Smallwood, David O. et al., Sandia National Labs., May/Jun. 1999, 27–35.

* cited by examiner

Primary Examiner—Michael Nghiem
(74) Attorney, Agent, or Firm—Jacobson Holman PLLC

(57) ABSTRACT

A method removes a pseudo signal from the main signal. An integrated original signal is derived by integrating the original signal with respect to time, and then, is decomposed into the sum of one Approximation and at least one Detail by wavelet transformation. The wavelet transformation is executed with deepening the level number until the level number reaches to the threshold level number at which the ratio of the energy of the one Approximation to the energy of the original signal has a predetermined relationship with a predetermined threshold value. The Approximation at the threshold level number as a pseudo signal component is approximated to zero, and the Approximation and Detail up to said threshold level number are reconstituted by wavelet inverse transformation.

6 Claims, 7 Drawing Sheets

PRIOR ART

METHOD FOR REMOVING PSEUDO SIGNAL AND PROGRAM FOR REMOVING PSEUDO SIGNAL

CROSS REFERENCE TO RELATED APPLICATIONS

This application makes reference to, incorporates the same herein, and claims all benefits accruing under 35 U.S.C. § 119 from an application for Method For Removing Pseudo Signal And Program For Removing Pseudo Signal earlier filed in the Japan Patent Office on Sep. 2, 2002 and there duly assigned Ser. No. 2002-256871.

BACKGROUND OF THE INVENTION

1. Field of the Invention

The present invention relates to methods for processing signals, and more particularly to a method for removing a pseudo signal having a lot of energy contained in the signals.

2. Description of Prior Art

A conventional method for processing signals using Fourier transformation is superior for grasping and processing a signal in the frequency domain, and are the techniques used in various fields. However, Fourier transformation is not suitable for grasping and processing a signal in the time domain in comparison with a method for processing signals by using wavelet transformation which has been researched and developed in several fields for these years. In the impact tests for such as satellites, when the acceleration signal measured contains a pseudo signal, since the prior arts have no effective way to remove the pseudo signal, the test data having frequent pseudo signals had to be given up for out of evaluation.

Since the conventional method for processing signals using Fourier transformation presumes that the signals have periodicity, and since it processes the signals in the frequency domain, it cannot process the signal component useful as test data (hereinafter called "main signal component") by separating a pseudo signal components therefrom. On the other hand, simple use of a prior art method for processing signals by wavelet transformation has a problem that even the main signal component can be removed when the pseudo signal component is not significant in comparison with the main signal component.

SUMMARY OF THE INVENTION

Accordingly, it is an object of the present invention to solve the aforementioned problems, and the present invention provides a method for removing a pseudo signal from an original signal which includes the pseudo signal consisting of zero-shift components.

The aforementioned problems can be solved by the present invention having the following features. The present invention includes a method for removing a pseudo signal from an original signal which includes a main signal free from a zero-shift component and the pseudo signal consisting of zero-shift components, the method comprising the steps of means for integrating said original signal with respect to time; means for decomposing said integrated original signal is decomposed into the sum of one Approximation (A(t)) and at least one Detail (D(t)) by wavelet transformation with a level number deepened until which level number reaches to a threshold level number where the ratio of the energy of said one Approximation to the energy of said original signal has a predetermined relationship to a predetermined threshold value; means for setting said Approximation to zero at said threshold level number as a pseudo signal component by a threshold operation; means for deriving an integrated main signal by reconstituting said Details up to said threshold level and said Approximation previously set to zero by wavelet inverse transformation; and means for deriving said main signal by differentiating said integrated main signal with respect to time.

The present invention also includes that, in the method for removing a pseudo signal just described, said threshold level number is the minimum of the level numbers where the ratio of the energy of said one Approximation to the energy of said original signal becomes smaller than a predetermined threshold value.

The present invention further includes that, in the method for removing a pseudo signal, said original signal is an acceleration signal detected by a sensor for an impact test, and said pseudo signal is a zero-shift component induced to said sensor by the impact of said impact test.

In addition, the present invention includes an apparatus for removing a pseudo signal from an original signal which includes a main signal free from a zero-shift component and the pseudo signal consisting of zero-shift components, the apparatus comprising means for integrating said original signal with respect to time; means for decomposing said integrated original signal is decomposed into the sum of one Approximation (A(t)) and at least one Detail (D(t)) by wavelet transformation with a level number deepened until which level number reaches to a threshold level number where the ratio of the energy of said one Approximation to the energy of said original signal has predetermined relationship to a predetermined threshold value; means for setting said Approximation to zero at said threshold level number as a pseudo signal component by a threshold operation; means for deriving an integrated main signal by reconstituting said Details up to said threshold level and said Approximation previously set to zero by wavelet inverse transformation; and means for deriving said main signal by differentiating said integrated main signal with respect to time.

The present invention also includes that, in the apparatus for removing a pseudo signal just described, said threshold level number is the minimum of the level numbers where the ratio of the energy of said one Approximation to the energy of said original signal becomes smaller than a predetermined threshold value.

The present invention further includes that, in the apparatus for removing a pseudo signal, said original signal is an acceleration signal detected by a sensor for an impact test, and said pseudo signal is a zero-shift component induced to said sensor by the impact of said impact test.

DESCRIPTION OF THE PREFERRED EMBODIMENT

Figure 1:
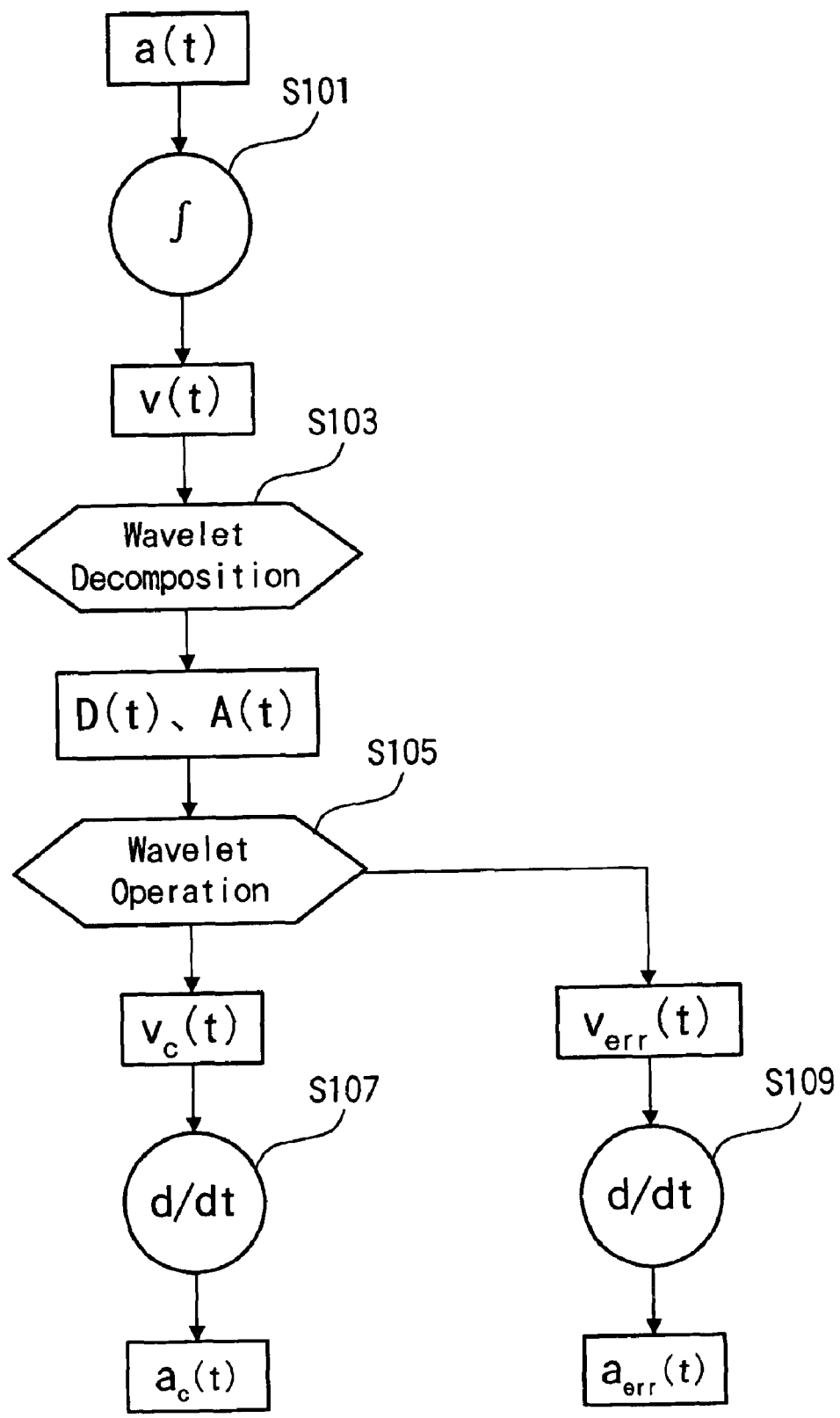
FIG. 1 is a flowchart showing operation of the method for removing a pseudo signal according to the present invention.

First, general notion of wavelet will be explained. Wavelet decomposition is a technique where a signal is decomposed by scaling (enlargement) and shifting (transition) of a function called "mother wavelet" into the sequence of wavelet coefficients, each of which is a partial approximation, and the signal is expressed thereby. Such mother wavelet is usually a localized waveform (support compact). Therefore, the waveform of a signal having a violent fluctuation can be expressed in small scale, and the waveform of a signal having a gentle fluctuation can be expressed in large scale. Since a pseudo signal component such as a zero-shift generally tends to deviate to a signal having a gentle fluctuation, the zero-shift component can be distinguished and removed by using such tendency. A typical procedure for the process of wavelet analysis is explained hereinafter. First, a wavelet coefficient C(j,k) represented by the following equation is derived by the wavelet transformation of signal s(t). s(t) is generally represented as a sequence of time-series waveform sample value:

$$C(j,k) = \int s(t) \frac{1}{\sqrt{a}} \psi\left(\frac{t-b}{a}\right) dt$$

where discretization scale is $a=2^j$ (j=1, 2, 3, ..., L (L is the level (hierarchical number) of wavelet)), shift is $b=k2^j$ (k=1, 2, 3, ..., L), and $\Psi$ is mother wavelet. In the present invention, by using Daubechies wavelet, the signal is separated by hierarchy according to wavelet coefficient C(j,k) as shown in the following equations:

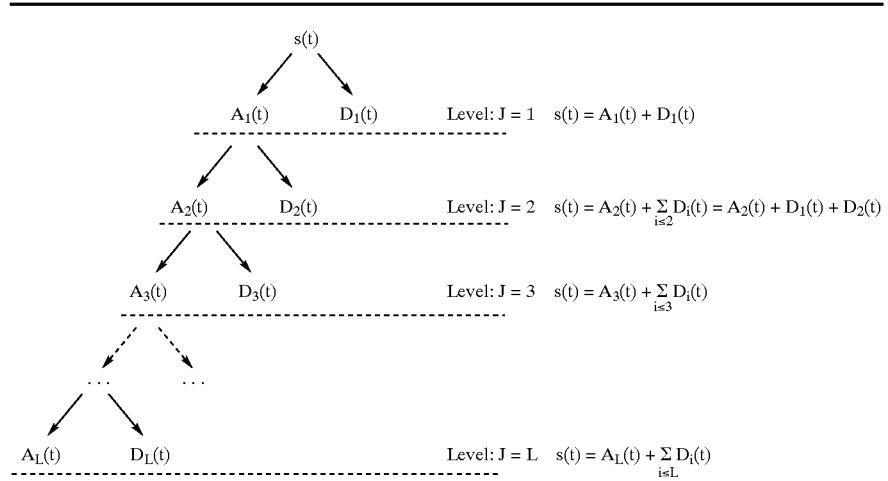

where $$D_j(t) = \sum_k C(j,k)\psi_{j,k}(t)$$

$$a = 2^j \leq 2^J$$

$$A_J(t) = \sum_{j>J} D_j(t)$$

$A_J(t)$ represents signal components having gentle fluctuation and large scale. After calculating the energy ratio:

$$E_J = \frac{\|A_J\|^2}{\|s\|^2} (\geq E_{J+1})$$

between signal $A_J(t)$ and original signal s(t), the wavelet transformation is executed with deepening the level number until the level number reaches to the level number (hereinafter called "threshold level number") at which the ratio of the energy $E_J$ has predetermined relationship with a predetermined threshold value. Namely, energy ratio $E_J$ is used as an evaluation standard for evaluating the level number required. Preferably, such threshold level number is the minimum of the level numbers where the ratio of the energy $E_J$ becomes smaller than a predetermined threshold value. As a result, the minimum of the level numbers where the ratio of the energy $E_J$ becomes smaller than a predetermined threshold value is determined as level J. The threshold value can be, for example, 99.7%. This is because the energy of A(t) having gentle fluctuation dominates most of the part of the energy of original signal s(t). Hereinafter this level J is called threshold level number. $A_J$ can be regarded as a pseudo signal component.

Next, a series of procedure in the specific numerical calculation method for the signal separation will be explained.

1) Selecting Type of Wavelet

In the present invention, Db3 (Daubechies wavelet, order N=3) was chosen. The following table shows the values of discrete mother wavelet function points which correspond to various values of N.

TABLE 1

| Type | Discrete mother wavelet function points (2 * N) | | | | | | | |
|---|---|---|---|---|---|---|---|---|
| Db1 | 0.5 | 0.5 | | | | | | |
| Db2 | 0.3415 | 0.5915 | 0.1585 | −0.0915 | | | | |
| Db3 | 0.2352 | 0.5706 | 0.3252 | −0.0955 | −0.0604 | 0.0249 | | |
| Db4 | 0.1629 | 0.5055 | 0.4461 | −0.0198 | −0.1323 | 0.0218 | 0.0233 | −0.0075 |
| Db5 | 0.1132 | 0.4270 | 0.5122 | 0.0979 | −0.1713 | −0.0228 | 0.0549 | −0.0044 |
| | −0.0089 | 0.0024 | | | | | | |
| Db6 | 0.0789 | 0.3498 | 0.5311 | 0.2229 | −0.1600 | −0.0918 | 0.0689 | 0.0195 |
| | −0.0223 | 0.0004 | 0.0034 | −0.0008 | | | | |
| Db7 | 0.0550 | 0.2804 | 0.5156 | 0.3322 | −0.1018 | −0.1584 | 0.0504 | 0.0570 |
| | −0.0269 | −0.0117 | 0.0089 | 0.0003 | −0.0013 | 0.0003 | | |

2) Calculating Low-pass Filter and High-pass Filter for Decomposition and Reconstitution The filters are calculated by using discrete points w(k), k=1, 2, . . . , 6 of Db3.

Reconstitution:

$$Lo\_R(k) = 0.707 w(k) / \sum_{k=1}^{2N} w(k),$$

$$Hi\_R(k) = (-1)^k Lo\_R(2N+1-k)$$

Decomposition:

$$Lo\_D(k) = Lo\_R(2N-k),$$

$$Hi\_D(k) = Hi\_R(2N-k)$$

3) Binary Down-sampling

As shown in the following equations, binary down-sampling is carried out by calculating convolution for signal s(t) and the filters:

$cA_1(k)=[Lo\_D(k)*s(k)]\cdot sam\_d(k), \ldots, cA_{j+1}(k)=[Lo\_D(k)*cA_j(k)]\cdot sam\_d(k)$ $cD_1(k)=[Hi\_D(k)*s(k)]\cdot sam\_d(k), \ldots, cD_{j+1}(k)=[Hi\_D(k)*cA_j(k)]\cdot sam\_d(k)$ The binary down-sampling is carried out by using the following binary down-sampling functions:

$x(k)=y(k)\cdot sam\_d(k)=y(2k-1)$, when the number of y is odd $x(k)=y(k)\cdot sam\_d(k)=y(2k)$, when the number of y is even This operation also diminishes the number of data into half. The following system flow chart shows the operation from level j to lower level j+1:

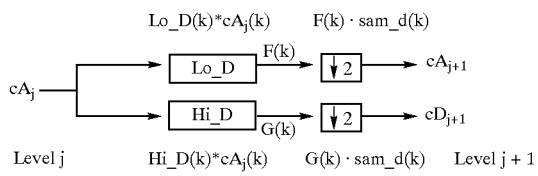

4) Deciding Level J of the Constituting Signal

Level J of the constituting signal is decided according to the energy ration:

$$E_J = \frac{\|A_J\|^2}{\|s\|^2}$$

For this purpose, the wavelet transformation is executed with deepening the level number until the threshold level number at which the ratio of the energy $E_j$ has predetermined relationship with the predetermined threshold value. Namely, energy ratio $E_J$ is used as an evaluation standard for evaluating the level number required. Preferably, such threshold level number is the minimum of the level numbers where the ratio of the energy $E_j$ becomes smaller than a predetermined threshold value. This is because Approximation representing most of the pseudo signal component can be obtained by the wavelet decomposition using such threshold level number. As a result, the minimum of the level numbers where the ratio of the energy $E_j$ becomes smaller than a predetermined threshold value is determined as level J. In the present invention, since the pseudo signal component dominates the integrated signal energy, the threshold value for the energy ratio can be, for example, 99.7%. In this way, the pseudo signal component is distinguished. Namely, by removing Approximation of level J, the pseudo signal component is removed.

5) Up-Sampling

The number of data is doubled by up-sampling which inserts zero between the data (between even numbers).

6) Reconstitution of the Signals

Two signals are reconstituted by using convolution with reconstituting low-pass filter and high-pass filter.

7) Constitution of the Signal

Signal is constituted by adding two signals formed in just described 6) together. The following system flow chart shows the operation from level j+1 to upper level j:

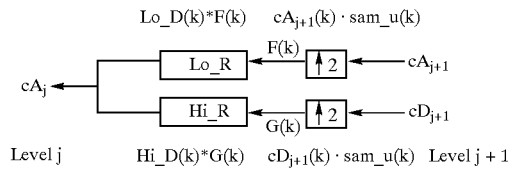

These are the general procedure for wavelet analysis.

Next, the method for removing the pseudo signal to which the above-described procedure is specifically applied will be explained. FIG. 1 is a flowchart showing the method for removing a pseudo signal according to the present invention. This method takes advantage of the characteristic that the pseudo signal component is emphasized by integrating the acceleration signal, and thus the energy ratio of the pseudo signal component to the original signal becomes large. The method of the present invention can be carried out by using such as a computer. Namely, it is carried out by inputting the original signal to the computer, applying the operations of integration, wavelet decomposition, threshold operation, reconstitution and differentiation to the original signal by using the processing means of the computer, and deriving the main signal.

Figure 2A:
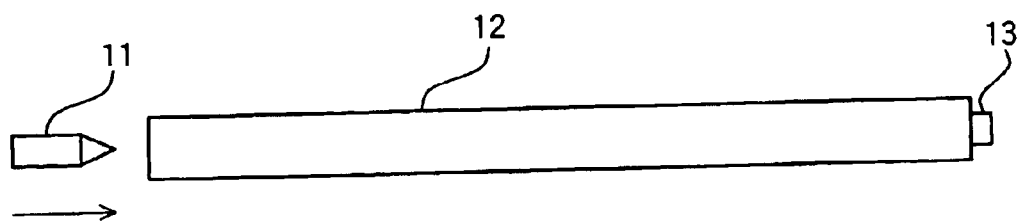
FIG. 2A is a schematic diagram showing the test system based on the method for measuring dynamic response characteristics by an impact acceleration meter used for a working example of the present invention.

Suppose a(t) is the original signal having a pseudo signal. The original signal is an acceleration signal detected by piezoelectric-type acceleration sensor 13 in the impact test as shown in FIG. 2A. First, original signal a(t) is integrated to obtain velocity signal v(t) (step S101).

Next, wavelet decomposition is applied to velocity signal v(t) to obtain the wavelet coefficient. The parameter for the wavelet decomposition can be, for example, Daubechies N=3 for mother wavelet. In this connection, the procedure in which removal of unwanted component from the wavelet coefficient is followed by reconstitution to obtain the constituting signal of the original signal is hereinafter called "wavelet operation." Velocity signal v(t) is decomposed into a pseudo signal component (what is called Approximation in wavelet transformation) A(t) and main signal component (what is called Detail in wavelet transformation) D(t) by a predetermined wavelet decomposition (step S103). Then, a predetermined wavelet operation is carried out. Here, the predetermined wavelet operation is such an operation that satisfies following conditions. First of all, the energy ratio of A(t) to original signal v(t), $E=\|A(t)\|^2/\|v(t)\|^2$, is calculated. Then, the A(t) which makes the energy ratio E smaller than a certain threshold value is derived, and the threshold level number which is the minimum of the level numbers as such is derived. In this way, by the wavelet decomposition at such threshold level number, D(t) of as many as the threshold number and one A(t) are obtained. In this regard, this threshold value represents the threshold value for the energy ratio of the pseudo signal component to the original signal, and it can be, for example, 99.7%. This is because, according to the method of the present invention, in the velocity signal derived by integrating the acceleration signal as the original signal, the pseudo signal component dominates large energy since the main signal does not have a zero-shift component and thus becomes almost zero when it is integrated. As a result, such A(t) can be regarded as a pseudo signal component. In this connection, the predetermined wavelet operation just described is an approximation of that A(t) at the threshold level number to zero by the threshold operation to be described afterward followed by a reconstitution of the signal by using A(t) and D(t). In this connection, it will do if the wavelet decomposition is carried out up to the level which is deep enough to derive the above-described threshold level number.

The wavelet operation is carried out for these D(t) and A(t) (step S105). The wavelet operation consists of removal of the pseudo signal component and reconstitution of a main signal. For the removal of the pseudo signal, first of all, there is a method where A(t) in the wavelet decomposition of the threshold level number is removed (made zero) as a pseudo signal component. In this case, residual D(t) represents the main signal. The wavelet reconstitution is carried out for the signal from which the pseudo signal component has been removed, and the resulting signal is output as velocity signal $v_c(t)$ corresponding to the main signal component. When A(t) is removed as a pseudo signal component, $v_c(t)$ is obtained by reconstituting D(t). On the other hand, the pseudo signal component is reconstituted by wavelet and is output as $v_{err}(t)$ corresponding to the pseudo signal. When A(t) is removed as a pseudo signal component, $v_{err}(t)$ is obtained by reconstituting A(t).

Acceleration signal $a_c(t)$ corrected (from which the pseudo signal component has been removed) is obtained by differentiating $v_c(t)$, which corresponds to the main signal component obtained by removing a pseudo signal component A(t) from the original velocity signal v(t), with time (step S107). Thus, acceleration signal $a_c(t)$ from which the pseudo signal consisting of a zero-shift component has been removed is obtained. In this connection, pseudo signal $a_{err}(t)$ is obtained when velocity signal $v_{err}(t)$ represented by the pseudo signal is differentiated with time (step S109).

According to the characteristics of wavelet transformation, for the mother wavelet and its level, other mother wavelet or its level can be chosen depending on the characteristics of the target signals.

WORKING EXAMPLES

Figure 2B:
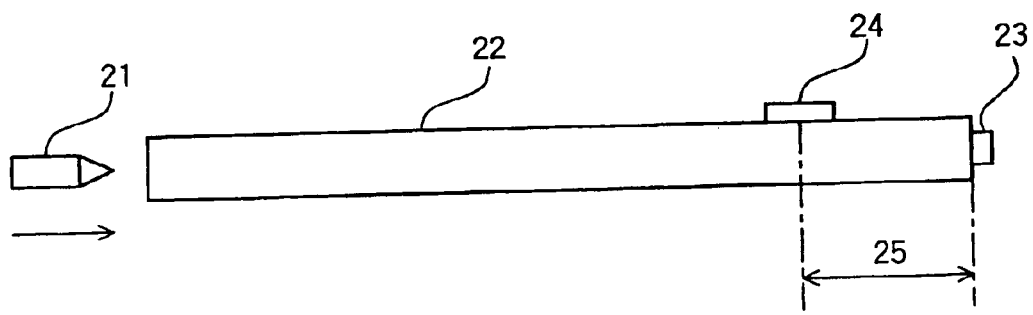
FIG. 2B is a schematic diagram showing the test system based on the method for measuring dynamic response characteristics by an impact acceleration meter disclosed in Japanese Patent publication for opposition purpose (Kokoku) No. 6-52270 used as a comparative example of the present invention.

As shown in FIG. 2A, impact response acceleration signal a(t) having a pseudo signal measured by piezoelectric-type acceleration sensor 13 mounted at the end of a bar 12, the other end of which is impacted by an impact bullet 11, the sensor 13 being used as an object of the method for processing a signal of the present invention. In this connection, the method for measuring dynamic response characteristics by an impact acceleration meter disclosed in Japanese Patent publication for opposition purpose (Kokoku) No. 6-52270, in which a pseudo signal due to the zero-shift does not arise theoretically, was used as a comparative example, and the impact response acceleration signal was measured by a strain gauge 24 mounted on a bar 22 at a distance 25 from the end of the bar 22 on which end a piezoelectric-type acceleration sensor 23 is mounted and the other of which is impacted by an impact bullet 21 as shown in FIG. 2B, thus the result obtained was used as a standard for quantification of the effect of the pseudo signal removal according to the present invention.

Figure 3:
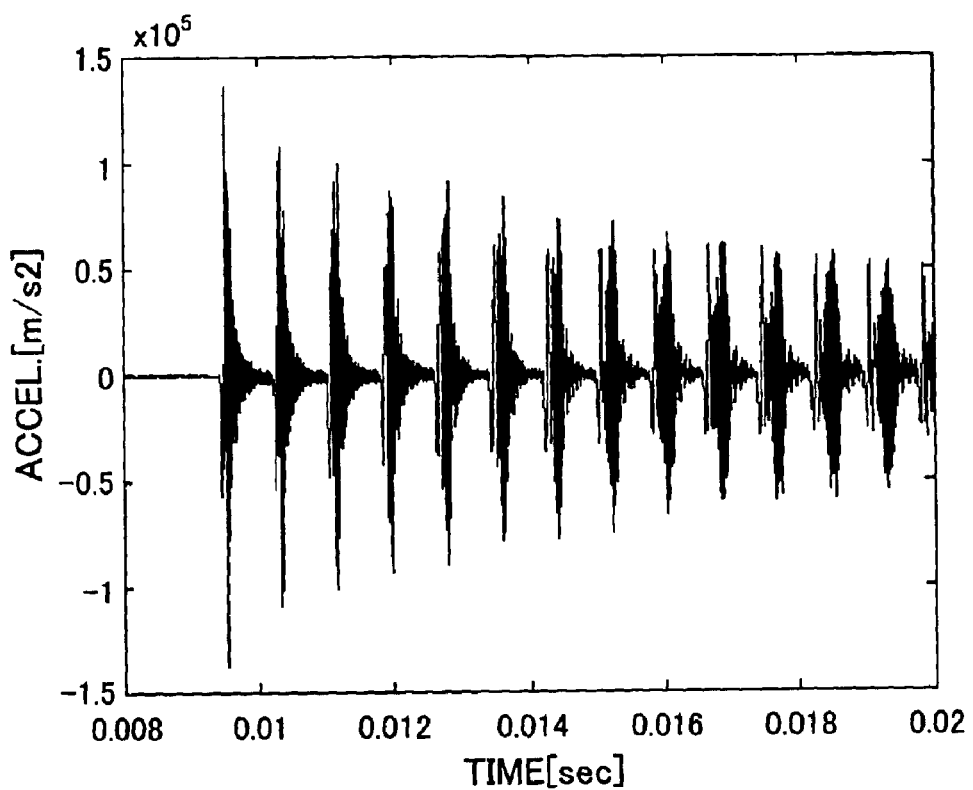
FIG. 3 is a diagram showing impact response acceleration signal a(t) having a pseudo signal.
Figure 4:
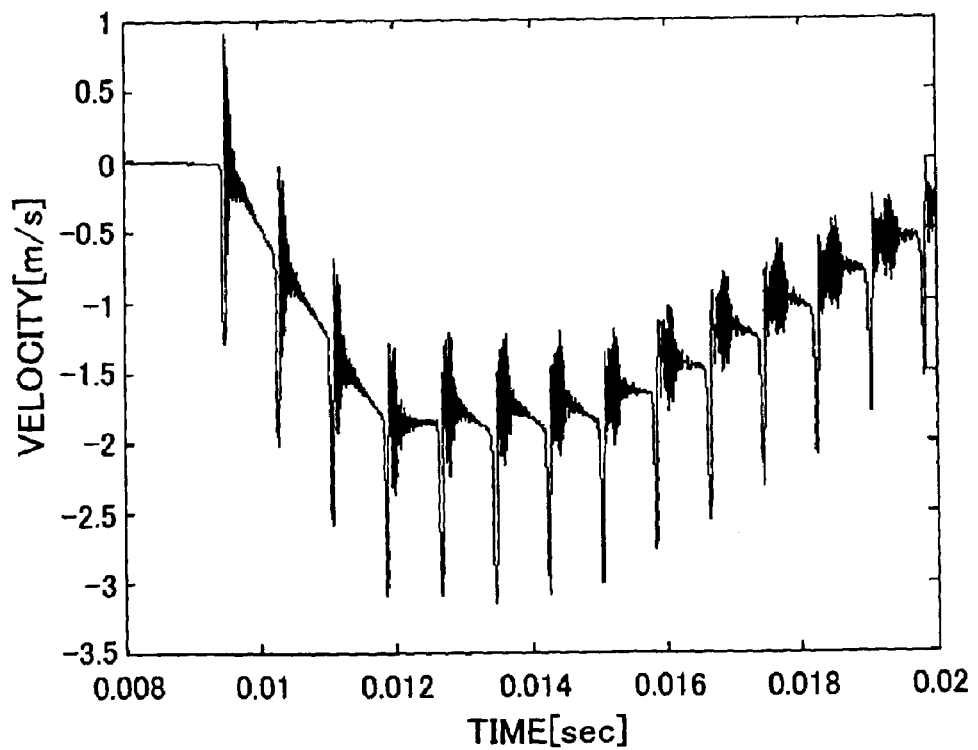
FIG. 4 is a diagram showing impact response velocity signal v(t) having a pseudo signal.
Figure 5:
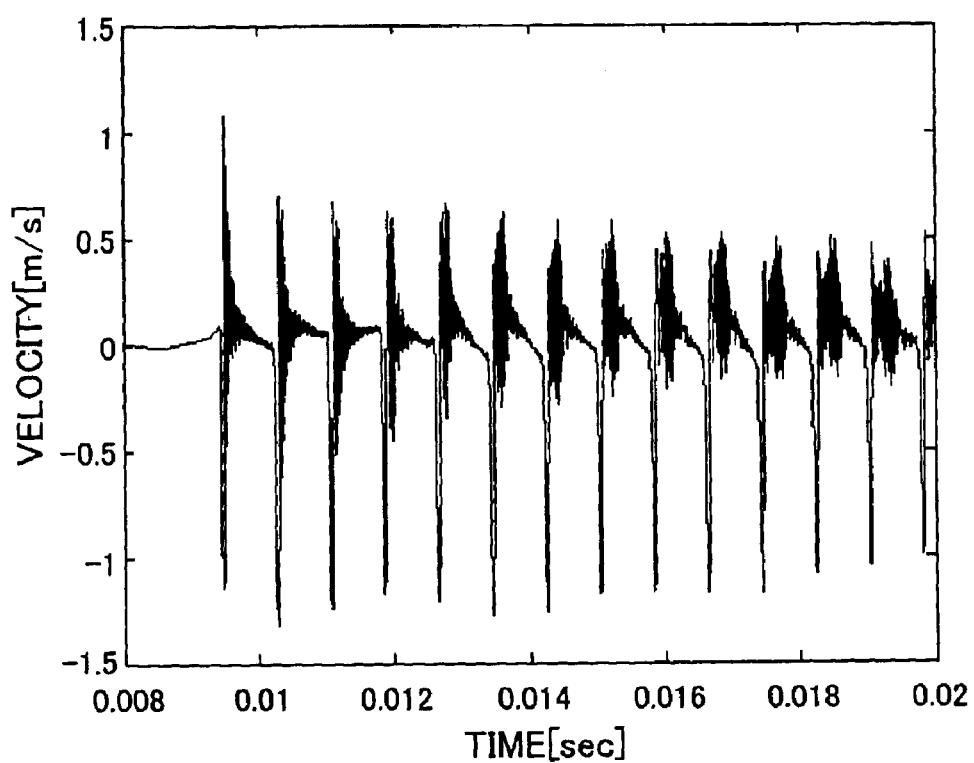
FIG. 5 is a diagram showing main signal component D(t) decomposed by wavelet.
Figure 6:
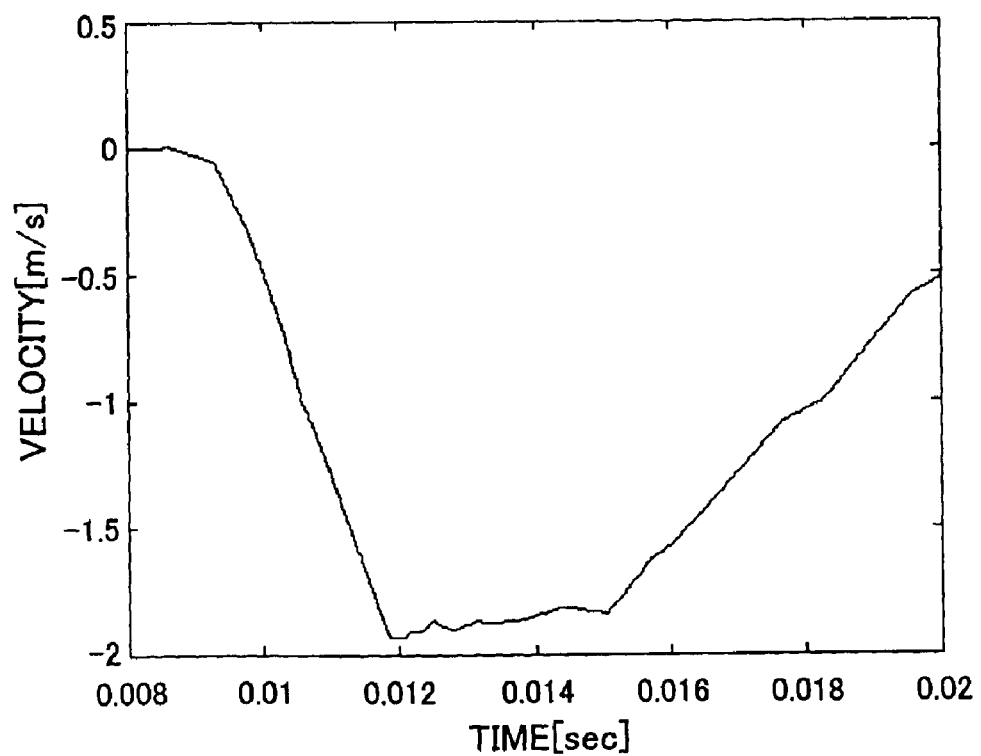
FIG. 6 is a diagram showing a pseudo signal component A(t) decomposed by wavelet.
Figure 7:
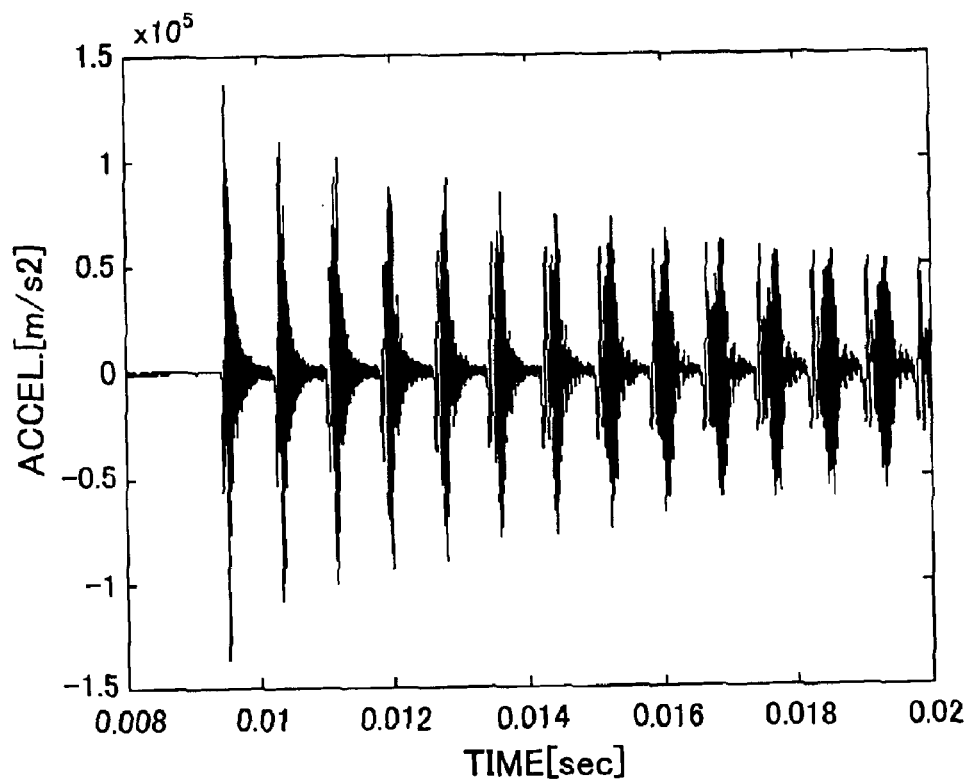
FIG. 7 is a diagram showing the waveform of impact response acceleration signal $a_c(t)$ from which a pseudo signal component has been removed.
Figure 8:
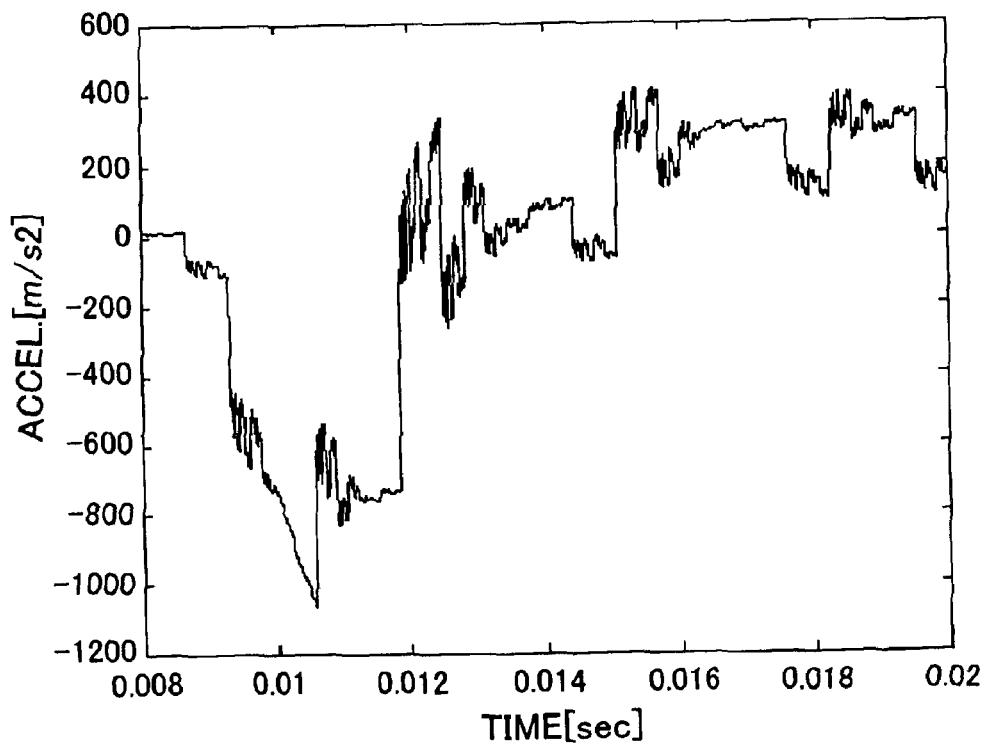
FIG. 8 is a diagram showing the waveform of impact response acceleration signal $a_{err}(t)$ of the pseudo signal component.
Figure 9:
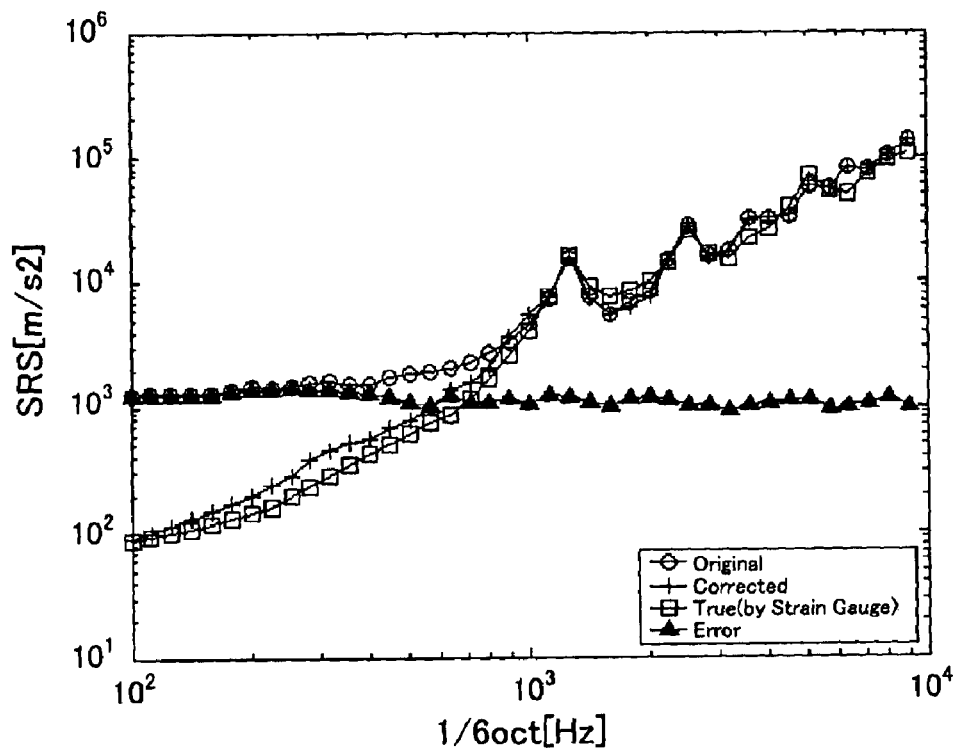
FIG. 9 is a diagram showing the results of the evaluation for removal of a pseudo signal by Shock Response Spectrum (SRS)

FIG. 3 is a diagram showing impact response acceleration signal a(t) from which a pseudo signal is to be removed. Velocity signal v(t) (FIG. 3) was obtained by integrating impact response acceleration signal a(t) shown in FIG. 3. Each of a(t) and v(t) has such shape shown in the figure because of the effect from the reflected wave at the end surface of the rod. Then v(t) was decomposed into main signal component D(t) (FIG. 5) and pseudo signal component A(t) (FIG. 6) by using wavelet decomposition. In this example, Daubechies N=3 was used as the wavelet. In this connection, threshold operation was carried out by assuming the energy ratio E of pseudo signal A(t) to the original signal v(t) was 99.57%. For this purpose, the wavelet transformation is executed with deepening the level number until the threshold level number at which the ratio of the energy $E_J$ has predetermined relationship with a predetermined threshold value. Namely, A(t) obtained by the wavelet decomposition at the threshold level number which was the minimum of the level numbers where the ratio of the energy E became smaller than 99.57% was removed as a pseudo signal component. Main signal component D(t), from which pseudo signal component A(t) has been removed, and which corresponds to corrected velocity signal $v_c(t)$, was differentiated with time to obtain corrected acceleration signal $a_c(t)$ (FIG. 7). In this connection, acceleration signal of the pseudo signal component $a_{err}(t)$ (FIG. 8) was obtained by differentiating pseudo signal component A(t) with time. FIG. 9 is a diagram showing the results of Shock Response Spectrum (SRS) analysis for a(t), $a_c(t)$, $a_{err}(t)$ and impact response acceleration signal $a_{true}(t)$, which was deemed as true value, measured by the strain gauge according to the comparative example. In FIG. 9, each SRS was denoted by "○" for a(t), "+" for $a_c(t)$, "□" for $a_{true}(t)$ and "▲" for $a_{err}(t)$, respectively. Referring to FIG. 9, it is observed that $a_c(t)$ fits $a_{true}(t)$ well, which means that the pseudo signal component was removed by the method of the present invention.

Figure 10:
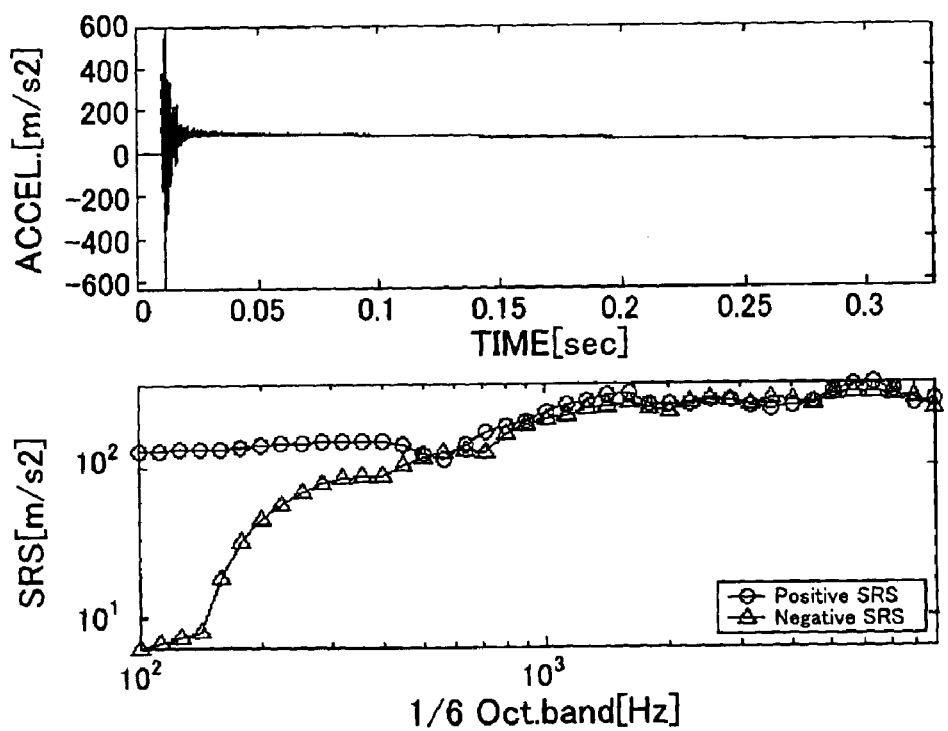
FIG. 10 is diagrams showing acceleration signal having a zero-shift and its SRS.
Figure 11:
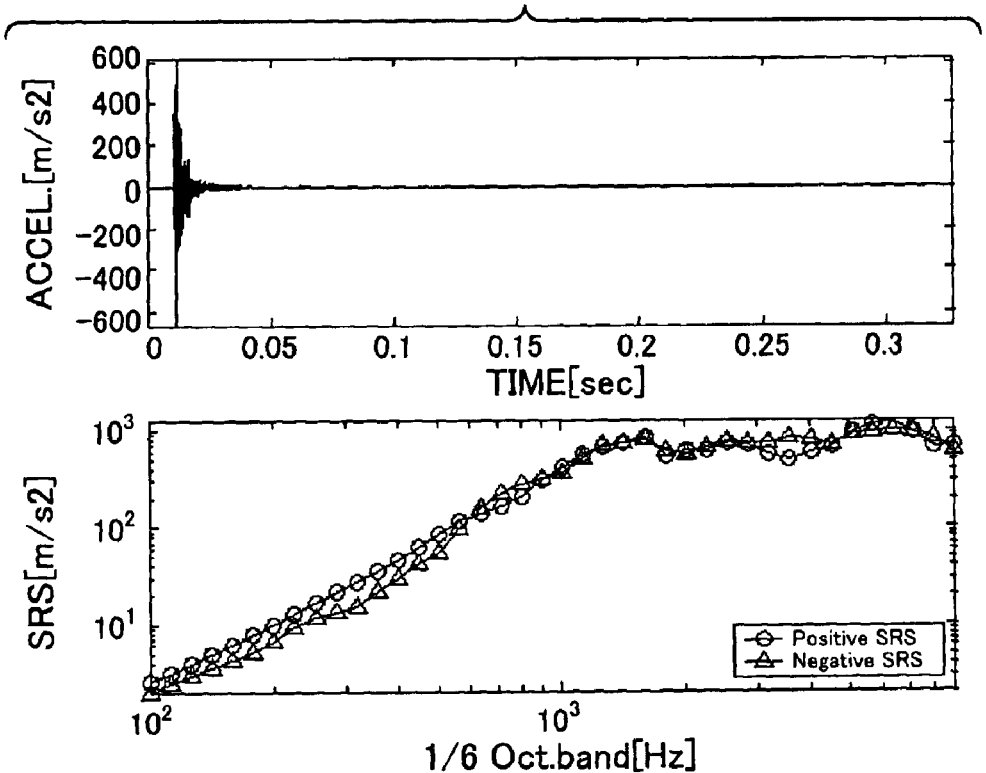
FIG. 11 is diagrams showing acceleration signal from which a pseudo signal has been removed according to the prior art method and its SRS.
Figure 12:
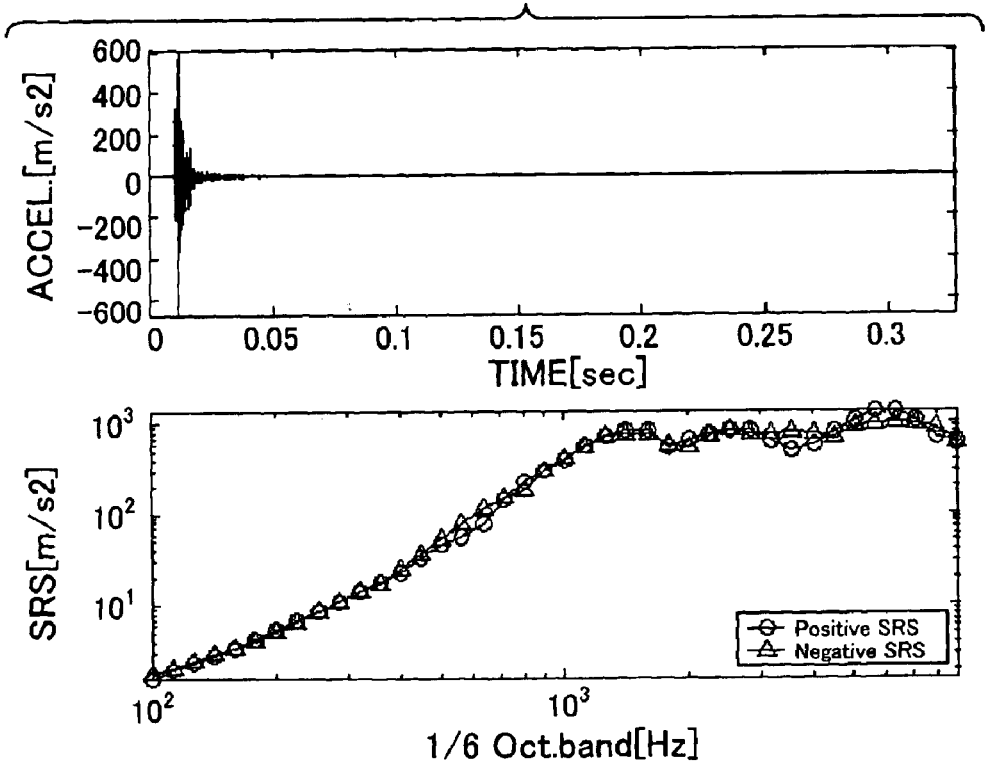
FIG. 12 is diagrams showing acceleration signal from which a pseudo signal has been removed according to the method of the present invention and its SRS.

From the following facts, it is understood that the precision of the zero-shift removal was improved by the method of the present invention, in comparison with the prior art. FIG. 10 is diagrams showing the original acceleration signal having a zero-shift (upper diagram) and its SRS (lower diagram). Referring to the acceleration signal, although it converges from the initial oscillation having large amplitude to a constant value, the center thereof deviates significantly upward from zero at any point of the time period, which shows that it has a zero-shift. In addition, referring to SRS, it is observed that the positive component denoted by "○" significantly deviates from the negative component denoted by "Δ", and is clearly recognized that the acceleration signal deviates to the positive side. FIG. 11 is a diagram showing the acceleration signal (upper diagram) which is an analytical result obtained by carrying out the wavelet operation directly (without carrying out the integration) to the acceleration signal according to the prior art method and its SRS (lower diagram). Referring to the acceleration signal, although it converges from the initial oscillation having large amplitude to a constant value, the center thereof deviates slightly upward from zero especially at the beginning, which shows that it has a zero-shift. In addition, referring to SRS, it is observed that the positive component denoted by "○" does not fit the negative component denoted by "Δ", and is also clearly recognized that the acceleration signal deviates slightly to the positive side. FIG. 12 shows the results obtained by integration of the acceleration signal to transform it to the velocity signal and to emphasize the zero-shift component followed by wavelet operation according to the method of the present invention. Referring to the acceleration signal, it converges from the initial oscillation having large amplitude to a constant value, and the center thereof locates near zero at any point of the time period, which shows that a zero-shift is scarcely observed. In addition, referring to SRS, it is observed that the positive component denoted by "○" nearly fits the negative component denoted by "Δ" throughout the whole region, and is clearly recognized that the acceleration signal has no deviation due to the zero-shift, which means that the pseudo signal component has been removed effectively. From these facts, it is understood that the precision of the zero-shift removal was significantly improved by the method of the present invention, in comparison with the prior art.

As described above, according to the present invention, the pseudo signal component can be effectively removed from the original signal which has the pseudo signal component consisting of zero-shift component.

What is claimed is:

1. A method for removing a pseudo signal from an original signal which includes a main signal free from a zero-shift component and the pseudo signal consisting of zero-shift components, the method comprising the steps of:

means for integrating said original signal with respect to time;

means for decomposing said integrated original signal into the sum of one Approximation (A(t)) and at least one Detail (D(t)) by wavelet transformation with a level number deepened until which level number reaches to a threshold level number where the ratio of the energy of said one Approximation to the energy of said original signal has a predetermined relationship to a predetermined threshold value;

means for setting said Approximation to zero at said threshold level number as a pseudo signal component by a threshold operation;

means for deriving an integrated main signal by reconstituting said Details up to said threshold level and said Approximation previously set to zero by wavelet inverse transformation; and means for deriving said main signal by differentiating said integrated main signal with respect to time.

2. The method for removing a pseudo signal according to claim 1, wherein said threshold level number is the minimum of the level numbers where the ratio of the energy of said one Approximation to the energy of said original signal becomes smaller than a predetermined threshold value.

3. The method for removing a pseudo signal according to claim 1, wherein said original signal is an acceleration signal detected by a sensor for an impact test, and said pseudo signal is a zero-shift component induced to said sensor by the impact of said impact test.

4. An apparatus for removing a pseudo signal from an original signal which includes a main signal free from a zero-shift component and the pseudo signal consisting of zero-shift components, the apparatus comprising:

means for integrating said original signal with respect to time;

means for decomposing said integrated original signal is decomposed into the sum of one Approximation (A(t)) and at least one Detail (D(t)) by wavelet transformation with a level number deepened until which level number reaches to a threshold level number where the ratio of the energy of said one Approximation to the energy of said original signal has a predetermined relationship to a predetermined threshold value;

means for setting said Approximation to zero at said threshold level number as a pseudo signal component by a threshold operation;

means for deriving an integrated main signal by reconstituting said Details up to said threshold level and said Approximation previously set to zero by wavelet inverse transformation; and means for deriving said main signal by differentiating said integrated main signal with respect to time.

5. The apparatus for removing a pseudo signal according to claim 4, wherein said threshold level number is the minimum of the level numbers where the ratio of the energy of said one Approximation to the energy of said original signal becomes smaller than a predetermined threshold value.

6. The apparatus for removing a pseudo signal according to claim 4, wherein said original signal is an acceleration signal detected by a sensor for an impact test, and said pseudo signal is a zero-shift component induced to said sensor by the impact of said impact test.

* * * * *